United States Patent [19]
Netzell

[11] 3,980,559
[45] Sept. 14, 1976

[54] METHOD AND AN APPARATUS FOR COLLECTING SUBSTANCES AND OBJECTS ON A LIQUID SURFACE

[76] Inventor: Ernst Sune Netzell, Selmedalsvagen 222, 126 58 Hagersten, Sweden

[22] Filed: Sept. 9, 1974

[21] Appl. No.: 504,221

[30] Foreign Application Priority Data
Sept. 10, 1973 Sweden............................. 7312288

[52] U.S. Cl............................. 210/83; 210/DIG. 25; 210/242 S
[51] Int. Cl.²......................................... E02B 15/04
[58] Field of Search................ 210/83, 242, DIG. 21

[56] References Cited
UNITED STATES PATENTS

| | | | |
|---|---|---|---|
| 3,219,190 | 11/1965 | Thune................................. | 210/242 |
| 3,539,048 | 11/1970 | Pearson................................ | 210/242 |
| 3,613,891 | 10/1971 | Cloutier.............................. | 210/242 |
| 3,656,624 | 4/1972 | Walton................................ | 210/242 |
| 3,670,896 | 6/1972 | Hale, Jr. et al...................... | 210/242 |
| 3,684,095 | 8/1972 | Ayers............................ | 210/DIG. 21 |
| 3,700,108 | 10/1972 | Richards....................... | 210/DIG. 21 |
| 3,817,385 | 6/1974 | Bergman....................... | 210/DIG. 21 |

*Primary Examiner*—Theodore A. Granger
*Attorney, Agent, or Firm*—Fred Philpitt

[57] ABSTRACT

A method and an apparatus for collecting substances and objects floating on a liquid surface, e.g. for collecting oil and oily substances on a water surface. The apparatus performing the method comprises means for separating the upper layer of the liquid and the substances and objects floating in this layer from the rest of the liquid; means for distributing the liquid over a comparatively large collecting area; means for collecting the substances and objects floating in said liquid layer; and means for draining off the cleaned liquid.

15 Claims, 6 Drawing Figures

METHOD AND AN APPARATUS FOR COLLECTING SUBSTANCES AND OBJECTS ON A LIQUID SURFACE

The present invention relates to a method and an apparatus for collecting substances and objects floating on a liquid surface, e.g. oil and similar impurities on a water surface.

It is well known that the general pollution of streams, lakes and the sea is a serious problem. The collection of oil which intentionally or unintentionally has been let out from ships is a very difficult problem, because it is often necessary to collect large quantities of oil in a short period of time to prevent the oil from reaching neighboring beaches and coasts. In connection with e.g. ship disasters, very large quantities of oil may be released, particularly if a tanker is involved in the disaster. On such occasions, the collection of oil is more difficult due to the fact that the oil spreads quickly over a large area, so that the oil layer floating on the water surface usually becomes rather thin.

The main object of the invention is to provide a method and an apparatus for collecting substances and objects floating on a liquid surface rapidly and efficiently.

When collecting oil and similar impurities on large expanses of water, it is necessary to use a craft for the operation. It is possible to use a number of booms which have been positioned around an area of oil to sweep the oil towards a stationary collecting craft or, alternatively, to use a craft provided with an apparatus for collecting oil when the craft is moving. Crafts provided with apparatuses for collecting oil when the crafts are moving are previously known, e.g. through the Swiss patent specification No. 460,652. These apparatuses for collecting oil usually comprise a conveyor having an endless belt in the bow of the craft. This belt takes up the oil from the water surface and carries it to a collecting receptacle on board the craft. However, such apparatuses for collecting oil have the disadvantage of causing a large bow wave when the craft is moving. This bow wave breaks up the oil layer which makes the collection of the oil more difficult or even impossible and, furthermore, forces the oil layer away from the collecting apparatus, which of course reduces the capacity of the apparatus.

Therefore, a further object of the invention is to provide a method and an apparatus for eliminating the detrimental effects of the bow wave and for using the bow wave to increase the capacity.

According to the invention the objects mentioned above are achieved by the method and the apparatus set forth in the claims.

Two embodiments of an apparatus according to the invention will now be fully described below, with reference to the accompanying drawings.

Figure 1:
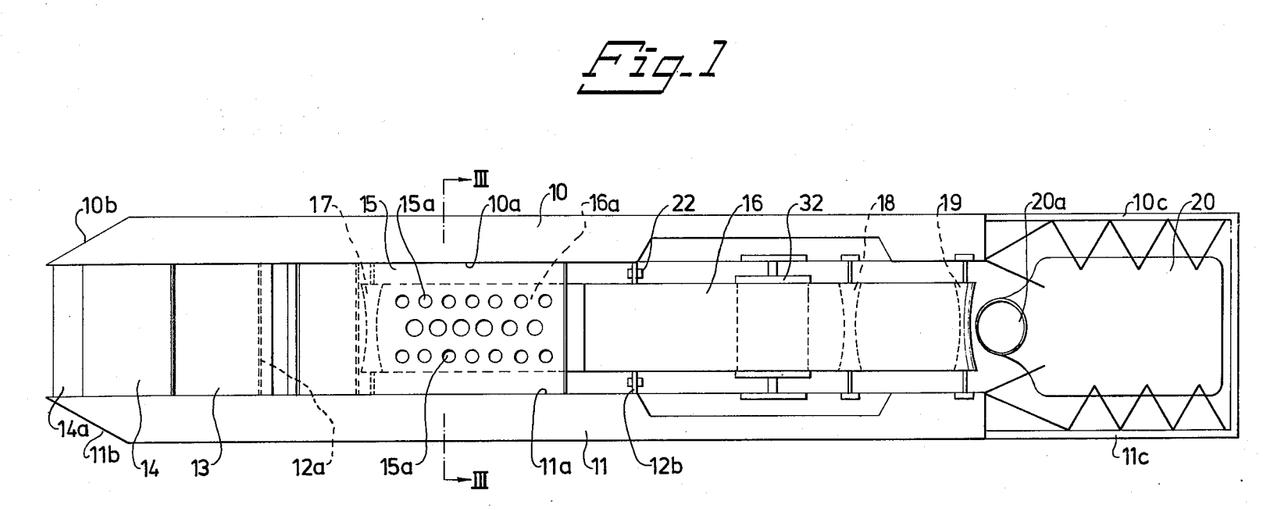
FIG. 1 is a diagrammatic plan view of one embodiment according to the invention of an apparatus, designed as a craft, for collecting oil and similar impurities on large water surfaces.
Figure 2:
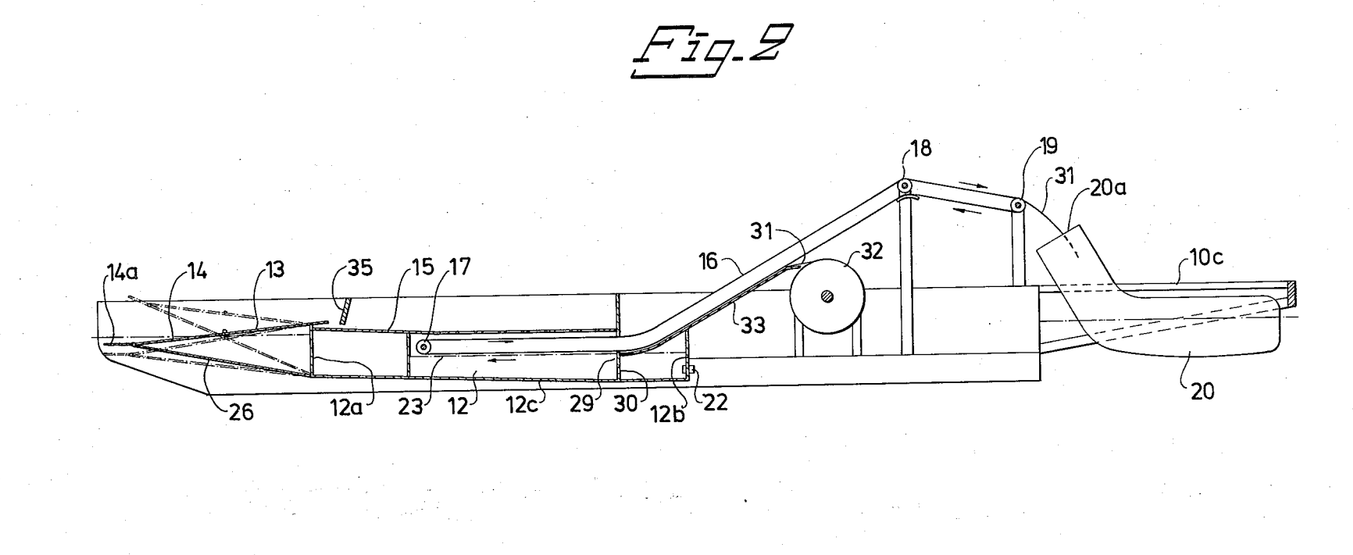
FIG. 2 is a diagrammatic side view of the apparatus shown in FIG. 1, with one side of the craft omitted.
Figure 3:
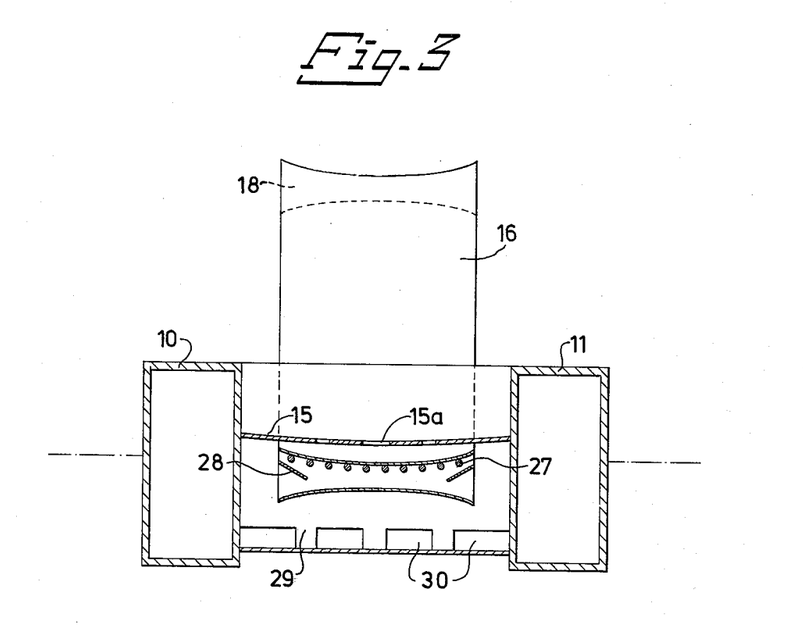
FIG. 3 is a transverse cross-sectional view taken on the line III—III in FIG. 1.

The embodiment shown in FIGS. 1–3 of the apparatus for collecting oil on a water surface comprises two parallel pontoons 10 and 11 positioned beside each other and, between these pontoons, a basin 12 formed by the opposite pontoon side walls 10a and 11a, two side walls 12a and 12b joined with and running between the pontoons, and a bottom plate 12c. At their front ends, the pontoons 10 and 11 have end surfaces 10b and 11b forming an acute angle with the inner side walls of the pontoons. The front side wall 12a of the basin 12 has an upper edge, which is below the upper surface of the pontoons and which can serve as a support for a system of plates 13, 14 and 14a extending forwards. These plates are positioned after each other and are rotatably connected with each other. The rear plate 13 is rotatably journalled between the pontoons, so that the plates can be adjusted in different angle positions in relation to the water surface and also in relation to themselves. The plates 13, 14 and 14a are only slightly shorter than the distance between walls 10a and 11a of the pontoons, so that practically no water can pass between the plates and the pontoons. The front edge of the plate 14a should be positioned at a certain distance under the surface of the water, so that water will flow up onto the plates, when the pontoons and the basin are moved forward through the water. A supporting plate 26 is positioned under the plates 13 and 14. The plate 14a is preferably adjusted substantially horizontally. Two alternative positions for the plates are shown with dashed lines in FIG. 2. The upper position is intended to be used when the craft is under way and not collecting oil.

The rear end of the plate 13 extends over the side wall 12a of the basin and is positioned adjacent to a distributing surface 15, which runs between the inner sides of the pontoons and completely covers the forward portion of the underlying basin 12. The front end of the distributing surface 15 is below the upper edge of the side wall 12a, as clearly shown in FIG. 2, so that a wall is formed which prevents the water on the distributing surface from flowing out again on the plates 13 and 14. The distributing surface slopes from the walls 10a, 11a and 12a of the basin inwards towards the basin but runs otherwise substantially parallel with the bottom of the basin. The distributing surface is connected at its rear end to a vertical wall extending to the upper surface of the pontoons. In its central section the distributing surface is provided with a number of holes 15a, which are distributed over the length of the distributing surface and dimensioned in such a way that the water, which flows out over the distributing surface, flows down through the holes and is substantially uniformly distributed over a large surface. Thus, the distributing surface and the surrounding walls form a large bowl with a bottom which is provided with holes and which receives and spreads the water flowing up over the plates 14 and 13. The desired distribution can be obtained by choosing the number, size and form of the holes in a suitable way or by using suitably positioned guiding shields.

A conveyor using a rotating, endless belt 16 is positioned under the distributing surface 15. The width of this belt is less than the width of the basin 12, so that a free space exists between the edges of the belt and the adjacent side walls 10a and 11a of the basin. The endless belt 16 runs around the spaced rollers 17, 18 and 19 in such a way that the upper and lower portions of the belt run compatatively near each other, as diagramatically indicated on the drawings. The conveyor belt is driven by rotating one of the spaced rollers 17–19 by means of a motor and e.g. driving chains (not shown).

The conveyor belt 16 runs under the portion of the distributing surface 15 which is provided with holes for the water, so that all the water running through the holes flows down onto the conveyor belt. The holes in the distributing surface are positioned and dimensioned in such a way that the water which flows out on the distributing surface is substantially uniformly distributed over a portion 16a of the conveyor belt which is running under the distributing surface. Thus, this portion of the conveyor belt is a collecting area. The front turning point of the conveyor belt at the roller 17 is situated near the front end of the distributing surface 15 and the back turning point of the conveyor belt at the roller 19 is situated at an entrance 20a to a collecting receptacle 20. This collecting receptacle 20 is arranged so as to float between two platforms 10c and 11c extending from the pontoons 10 and 11 in the water behind the craft.

The conveyor belt 16 is designed so as to allow the water flowing down onto the belt to pass through the belt but to stop and to carry away substances and objects floating on the water surface. Thus, the conveyor belt provides a filtering of the water. This can be obtained e.g. by using a small meshed net or a filtering material as conveyor belt. The water distributed over the collecting area of the conveyor belt then flows through both the upper portion of the belt, which runs towards the collecting receptacle, and the lower portion of the belt, which will replace the upper portion as collecting area, and further down into the basin.

The portion of the conveyor belt for the moment acting as collecting area, rests upon supporting rods 27, so that the belt gets a concave shape, when seen from above, along its longitudinal centre line. Therefore, the water running down on the belt is caused to flow towards the centre line of the belt, so that overflow at the longitudinal edges of the belt is prevented. The supporting rods will be more fully described below in connection with the description of the embodiment according to FIGS. 4–6.

The endless conveyor belt 16 may run in any path from the collecting place past the collecting receptacle 20 and back to the collecting place, but it is particularly advantageous to let the lower portion of the belt, which runs towards the collecting place, pass comparatively close to the upper portion of the belt, as shown in FIG. 2. This gives an important advantage in that also the underlying portion of the conveyor belt can be used for filtering the water which flows down from the distributing surface and for separating such substances and objects which have passed with the water through the upper portion of the belt. Thus, a double filtering of the water is obtained without any supplementary equipment. In this case, the underlying portion of the conveyor belt should also have supporting rods, so that also the lower portion of the conveyor belt obtains the desired curved shape.

The water in the basin must be drained off quickly, so that the water level is kept under the collecting portion of the conveyor belt. If also the lower portion of the conveyor belt is used as a filter, the water level must be kept under the lower portion of the conveyor belt.

As shown in FIG. 2, the basin is provided with pumps 22 on its back side wall 12b, so that the water level 23 in the basin can be kept on a sufficiently low level.

The back turning point of the conveyor belt at the roller 19 is situated over the gap between the platforms 10c and 11c, so that the entrance 20a of the collecting receptacle 20 can be applied in proximity to the turning point of the conveyor belt to facilitate the input of collected substances and objects into the collecting receptacle. When the collecting receptacle is full, it has to be replaced by a new one.

Figure 4:
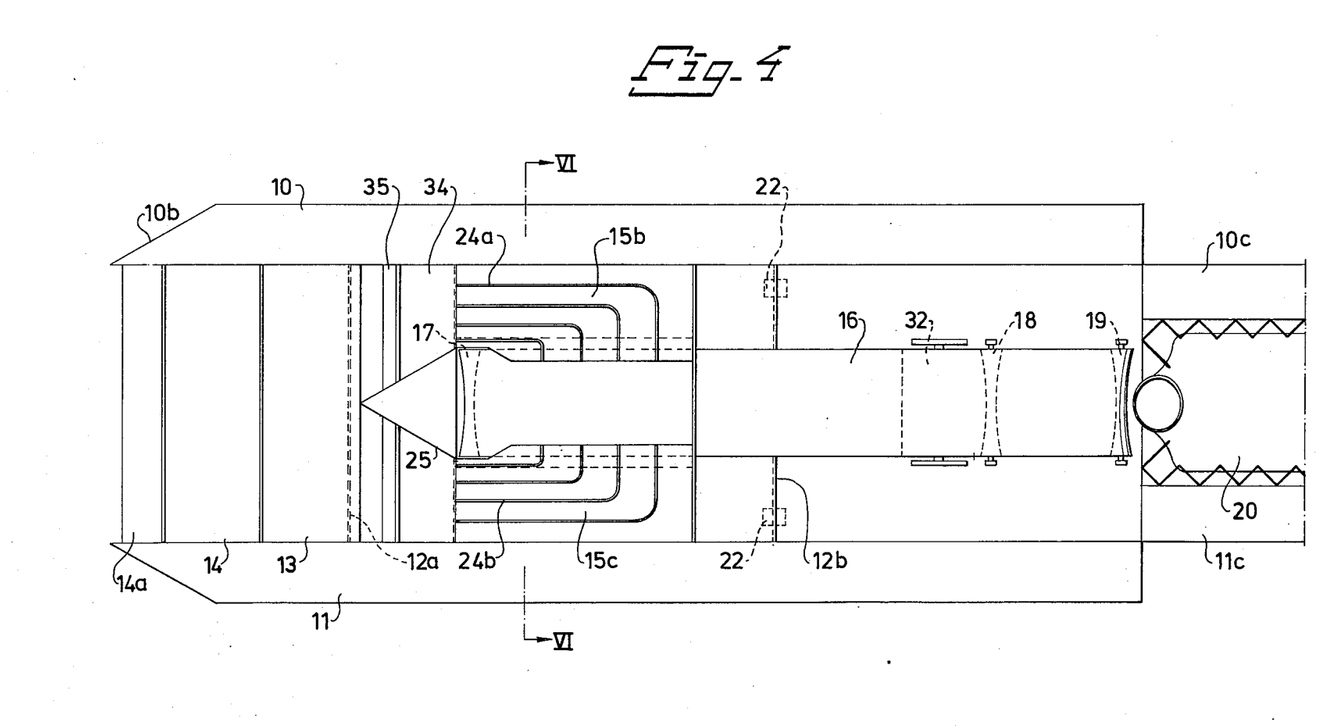
FIG. 4 is a diagrammatic plan view of a modified embodiment of the apparatus in which the entering water is separated into two portions.
Figure 5:
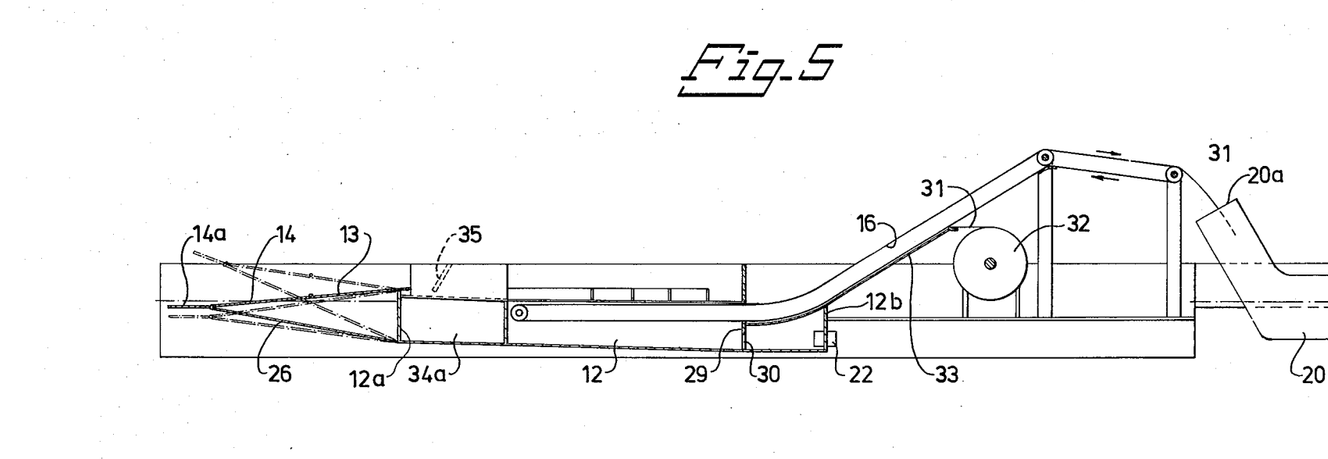
FIG. 5 is a diagrammatic side view of the apparatus shown in FIG. 4.
Figure 6:
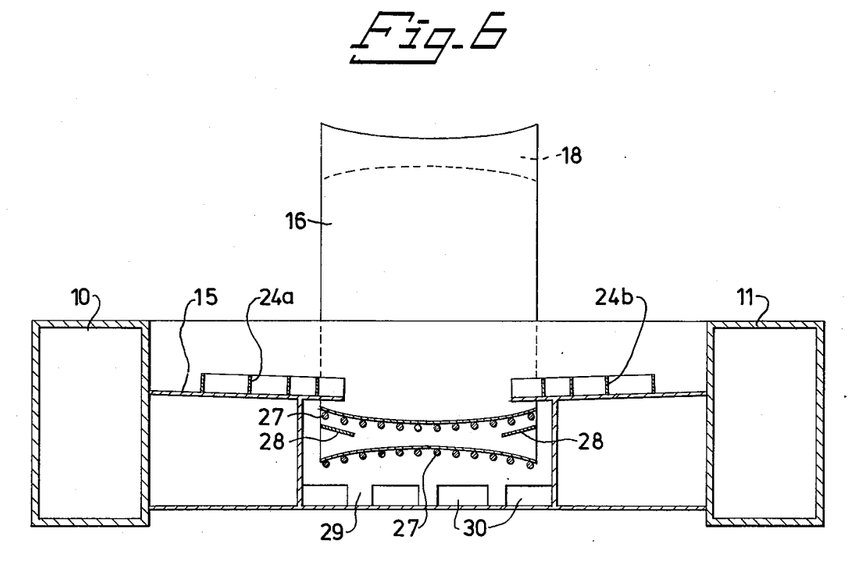
FIG. 6 is a transverse cross-sectional view taken on the line VI—VI in FIG. 4.

FIGS. 4–6 show a modified embodiment of a collecting device according to the invention. The basic construction with the pontoons 10 and 11, the basin 12, the plates 13, 14 and 14a, the distributing surface 15, the conveyor belt 16 and the collecting receptacle 20 is the same as the one that has been described above in connection with FIGS. 1–3. The corresponding parts have been given the same reference numerals. The difference is that the distance between the pontoons 10 and 11 is longer, that the distributing surface 15 is divided into two parallel arms 15b and 15c and that a wedge-shaped partition 25 is arranged at the beginning of the distributing surface, so that the water flowing up over the plates 14 and 13 is divided into two streams, guided to the two arms 15b and 15c of the distributing surface, respectively. A gap is provided between the inner edges of the arms of the distributing surface, the gap being shorter than the width of the conveyor belt. This gap is positioned substantially straight over the conveyor belt, so that the water flowing down from the arms of the distributing surface will fall down onto the conveyor belt. In this embodiment, the arms 15b and 15c of the distributing surface consist of plates without any holes, so that the water together with the substances and objects will flow over the edges down onto the conveyor belt 16. The arms are provided with L-shaped guiding flanges 24a and 24b which extend substantially perpendicularly to the surface of the arms, so that a number of adjacent channels are formed for distributing the water over the conveyor belt. The surfaces of the arms 15b and 15c slope downwards towards the conveyor belt to further facilitate the flow of the water down onto the conveyor belt.

The arms of the distributing surface are dimensioned with respect to length, width and slope towards the conveyor belt in such a way that a good distribution of the water is achieved. The side edges of the arms run along a large portion of the conveyor belt, so that always a substantial portion of the conveyor belt is used as a collecting area for the flowing water and for the substances and objects carried by the water.

As shown in FIG. 5, also in this embodiment the plates 13 and 14 are provided with an underlying supporting plate 26 primarily for increasing the stability of the plates 13 and 14. The plates 13, 14 and 26 form together a wedge-like body. In this embodiment, the upper portion of the back plate 13 rests upon the front side wall 12a of the basin without being attached to it. Therefore, in this embodiment too, the plates 13 and 14 may be adjusted to arbitrary angles in relation to the water surface. As in the first embodiment, the front plate 14 is provided with a projecting portion 14a, which may also be adjusted to the desired position in relation to the water surface to facilitate the collecting operation.

FIG. 6 shows a number of longitudinal supporting rods 27 for guiding the belt in its path, so that the desired concave or convex form is obtained. The upper portion of the belt, as seen from above, is concave, so that the water flows towards the longitudinal centre line of the belt, and the lower portion of the belt is convex so that the water flowing down from the upper portion flows towards the edges of the lower portion. Between the upper and lower portions, at the edges of the belt, guiding plates 28 are arranged to guide the water flowing through the upper portion at its edges towards the middle of the lower portion of the belt.

In front of the pumps 22 the basin 12 is provided with a transverse baffle plate 29, which at the bottom is provided with openings 30, as shown in FIGS. 5 and 6. The baffle plate is arranged to secure that a quantity of water always stays at the pumps 22 irrespective of the movements of the craft.

The forward portion of the distributing surface may comprise a removable plate 34 which covers an underlying space 34a forming a pit in front of the distributing surface, when the plate 34 is removed. This pit contributes to reduce the waves, if any, in the flowing water and it also provides a calmer waterflow over the distributing surface. A further reduction of the waves can be obtained by positioning a screen plate 35 at a distance above the distributing surface, so that the water flowing to the distributing surface is forced to flow through a narrow gap.

The substances and objects collected from the water are often viscous and adhesive and adhere to a clean surface of the conveyor belt. Therefore, if no measures are taken, they do not leave the conveyor belt at its upper turning point to fall down into the collecting receptacle. Thus, scrapers have to be positioned at the upper turning point of the conveyor belt to transfer the substances and objects to the collecting receptacle. Such scrapers, however, cannot entirely remove viscous substances and after having made a few revolutions, the conveyor belt will be covered by a thin, slippery, oily layer which to a very great extent reduces the capacity of the belt to transport such substances.

However, this difficulty can be overcome by using a protecting layer of a flexible material, e.g. a throwaway paper band which is pervious to water and which is arranged to run over the conveyor belt, so that the substances floating with the water always will come into contact with a clean collecting surface. This protecting layer may then easily be removed from the conveyor belt at the collecting receptacle, as described more in detail in the British patent specification No. 1,351,216.

In the embodiments described above, a protecting layer of a flexible material is used in the way mentioned in said patent specification. This protecting layer is of such a nature that it is pervious to water to the extent necessary to enable the water which flows down onto the collecting surface to flow through the collecting surface down into the basin. This water permeability may be obtained in several ways. The protecting layer may e.g. be a small-meshed woven fabric of paper, a woven or non-woven fabric of plastics or glass fibres or some filter material. It is also possible to utilize a band of paper or plastics, which has been provided with a great number of small holes or openings uniformly distributed over the surface of the protecting layer. The holes or openings in the protecting layer has to be dimensioned in such a way that the oildrops or oil particles but not the water are stopped by the protecting layer.

The protecting layer consists of a band 31 of a flexible filter material which comes from a supply roll 32. This band is caused to follow the endless conveyor belt 16 from the supply roll 32 to the front turning point at the roller 17 for the endless band, around the roller and further on the upper side of the conveyor belt up to the collecting receptacle 20 and into the latter, as is shown in FIG. 2. Thus, the filter band will perform the function of a protecting layer for the endless conveyor belt, so that the substances and objects to be transported by the conveyor belt will adhere to the protecting layer only and may easily be removed from the endless conveyor belt and introduced into the collecting receptacle together with the protecting layer. The band 31 on the lower side of the conveyor belt 16 is guided by means of guiding plates 33. In FIG. 2, only one of these guiding plates is shown.

When a protecting layer is used, the conveyor belt may consist of a comparatively wide-meshed net. If the protecting layer band is strong enough, the endless conveyor belt may be omitted.

The device described above works as follows:

When the craft arrives at an area where the water surface is polluted, the plates in front of the basin are adjusted in such a way that the front edge of the leading plate is positioned at appropriate distance under the water surface. This distance is choosen from case to case depending on the substances and objects floating on the surface. Then, the slope of the plates is adjusted in such a way that, when the craft moves through the water, the upper layer of the water and the substances and objects floating in this layer flow up on the plates and over the upper edge of the plates and further out on the distributing surface, where the polluted water is distributed and spread out. From the distributing surface the water and the carried substances and objects flow either through holes in the distributing surface (FIGS. 1–3) or over the edges of the distributing surface (FIGS. 4–6) onto the collecting area which constitutes a large portion of the conveyor belt. The substances and objects carried by the water are collected by the conveyor belt or by a protecting layer resting on the conveyor belt and transported to the collecting receptacle. The water which flows through the conveyor belt is drained off through the pumps arranged at the rear wall of the basin.

Thus, the invention makes use of the bow wave, which inevitably arises when the craft moves through the water, to convey the upper layer of the water, which is mixed with substances and objects, up on the distributing surface. Thus, the detrimental effects of the bow wave mentioned above are eliminated. Furthermore, by the use of a large distributing surface, a distribution of the water quantities flowing in is obtained, so that the water is distributed and spread out over a large collecting area. By the use of a large collecting area, large quantities of water can pass through the collecting area very quickly. This provides the device with a high capacity. Further increase of the capacity is obtained by dividing the flowing water into two streams or more, which from different directions flow down onto the collecting area. The basin may also be lowered so deep into the water that the water may flow down into the basin even if the craft is stationary in the water. The immersion into the water may be obtained by filling e.g. ballast tanks with water.

Although only two embodiments of the invention has been described and shown, it is evident that within the scope of the idea of the invention a great number of different embodiments and modifications are possible. One example is to partially provide the distributing surface with holes, so that one portion of the water will flow down from the distributing surface over an edge and another portion will flow down through holes in the distributing surface. The important idea is that the device is designed so that the water flowing in is uniformly distributed over a large water permeable collecting sheet or area. The surface which separates and elevates the water layer may be constructed in many different ways and may consist of one or more plates which can be curved or plane. These plates may be pivoted and adjustable to different positions, manually or automatically, and provided with high side flanges, if necessary. If the water flowing in is to be divided, the partition may be designed in many ways and placed at any suitable distance from the front edge of the distributing surface. Instead of plates provided with holes, floor gratings may be used. The supporting rods under the conveyor belt may be replaced by corrugated metal sheets, the ridges of the corrugations of these sheets ranging in the transport direction of the conveyor belt. When the load on the conveyor belt increases, an increasing portion of the ridges will support the conveyor belt. Owing to this, a bearing or supporting surface corresponding to the charge is obtained. The grooves of the corrugations are provided with holes to let the water drain off. It is also possible, of course, to design the basin in such a way that it floats by itself, so that the pontoons will not be necessary. The receptacle may be floating or arranged on board the craft. Furthermore, the basin may be provided with a motor for moving through the water, or be arranged to be towed.

It is evident that the method and device according to the invention may be used for separating many different substances and objects from other liquids than water, and that the basin not necessarily has to float on the liquid, but may be stationary positioned at a certain distance under a second basin, which contains the liquid to be cleaned from undesired substances and objects floating on the surface. In this case, the pivoted front plates may be omitted. This application of the invention is possible in sewage treatment works and the like. In certain cases, it may also be possible to omit the basin and to let the filtered liquid drain off freely.

I claim:

1. Apparatus for collecting material floating on the surface of a body of water, said apparatus being characterized by spaced apart pontoon members which form between them an inlet section that is adapted to conduct a collected liquid layer between said pontoon members, said liquid layer containing material floating thereon, endless belt means located between said pontoon members and constructed and arranged so that the rear discharge end of said endless belt means is at a higher elevation than the generally horizontal front end portion of said endless belt means, transferring means for transferring the liquid collected through said inlet section between said pontoon members onto the upper surface of the front end portion of said endless belt means, said transferring means including a generally horizontal distribution surface that is disposed above the generally horizontal front end portion of said endless belt means, said transferring means being in fluid communication with said inlet section between said pontoon members, said generally horizontal distribution surface including discharge means for discharging liquid downwardly from said horizontal distribution surface onto the top of the front end portion of said endless belt means, and means for removing collected material from the discharge end of said endless belt means and depositing it in a receptacle located adjacent the discharge end of the endless belt means.

2. An apparatus according to claim 1 wherein a collecting sheet is disposed around said endless belt means, said collecting sheet being pervious to water but impervious to at least some of the material floating on the water.

3. An apparatus according to claim 1 wherein said discharge means for discharging liquid downwardly from said generally horizontal distribution surface extends in an elongated path which is in alignment with the direction of movement of said endless belt means.

4. An apparatus according to claim 1 in which the discharge means for discharging the liquid downwardly from said generally horizontal distribution surface includes a number of openings spaced over said generally horizontal distribution surface through which openings the liquid and floating material flow down onto and spread over the endless belt means.

5. An apparatus according to claim 1 wherein a dividing means is disposed in the path between said pontoon members and adjacent said transferring means so that the inflowing liquid is divided into at least two portions, the said horizontal distributing surface being inclined in such a way that the divided portions of the liquid flow toward said discharge means from at least two different directions.

6. An apparatus according to claim 2 particularly for collecting oil floating on water surfaces, including a basin beneath said collecting sheet and at least one plate extending forwards from the basin, the front edge of the plate being arranged to be positioned at a desired distance under the surface of the body of water and the rear edge of the plate being arranged to be positioned above the surface of the body of water so that when the basin is moving forward through a body of water said upper layer and objects floating in it are forced up on the plate, the generally horizontal distributing surface being arranged adjacent to the rear edge of the plate, so that the said upper layer flowing up on the plate may flow over the rear edge of the plate and out onto said distributing surface.

7. An apparatus according to claim 2 in which the distributing surface comprises substantially parallel arms, the arms being arranged on either side of the collecting sheet and slanting towards the collecting sheet, the inner edges of the arms running over the collecting sheet substantially parallel with the collecting sheet.

8. An apparatus according to claim 1 wherein the portion of the endless belt means which extends under said discharge means is arranged in such a way that the liquid flowing down from the substantially horizontal distributing surface flows first through the rearwardly moving portion of the endless belt means and then through the lower forwardly moving portion of the endless belt that is immediately below the rearwardly moving portion of the endless belt means so that both the upper and the lower portion of the endless belt means is used to separate the substances and objects floating in the liquid from the liquid itself.

9. An apparatus according to claim 6 in which a liquid reservoir is positioned between said forward extending plate and the generally horizontal distributing surface, so that heavy wave motions of the entering liquid are reduced.

10. An apparatus according to claim 1 in which the generally horizontal distributing surface is provided with a number of elongated guiding flanges which are substantially perpendicular to the distributing surface and which, between themselves, form a number of channels through which the liquid flowing over the distributing surface is channelled toward said discharge means.

11. An apparatus according to claim 6 in which the forwardly extending plate is adjustable with regard to the inclination in relation to the body of water and arranged to rest with its rear end upon a support at the front end of the basin.

12. A method for collecting material floating on a body of water, comprising the steps of
 a. separating from said body of water an upper layer of water together with the material floating thereon by channelling said upper layer between two pontoon members,
 b. spreading out said separated upper layer and floating material over a substantially horizontal distribution surface,
 c. directing the horizontally distributed layer and floating material formed in step (b) to flow toward a discharge means of restricted area that is located inwardly from the sides of said distribution surface and centrally with respect to said pontoon members,
 d. depositing the material discharged downwardly from said restricted discharge means upon a filtering surface that includes an endless belt means which effects at least a partial separation between liquid and solid materials floating thereon,
 e. extending the deposition of said material discharged from said restricted discharge means upon said filtering surface along an elongated path that is aligned with the direction of movement of the endless belt means,
 f. moving said filtering surface to a collection zone and discharging to said collection zone the collected solid materials, and
 g. draining off the liquid flowing through said filtering surface so quickly that there will be a space substantially free from liquid under said filtering surface.

13. A method according to claim 12 which includes elevating said upper layer in step (a) to a level above the level of the body of water and then causing the said layer to flow down from this level over said substantial horizontal distribution surface and through said filtering surface including an endless conveyor into a liquid reservoir located beneath said filtering surface.

14. A method according to claim 13 in which said upper layer is caused to flow up over a guiding surface to said horizontal distribution surface by moving said guiding surface forward through the body of water.

15. A method according to claim 14 in which said elevated liquid layer is divided into two substantially equal portions by a dividing means located in the path between said pontoon members and caused to flow over said substantially horizontal distribution surface towards the filtering surface in two different directions.

* * * * *